Patented Apr. 26, 1938

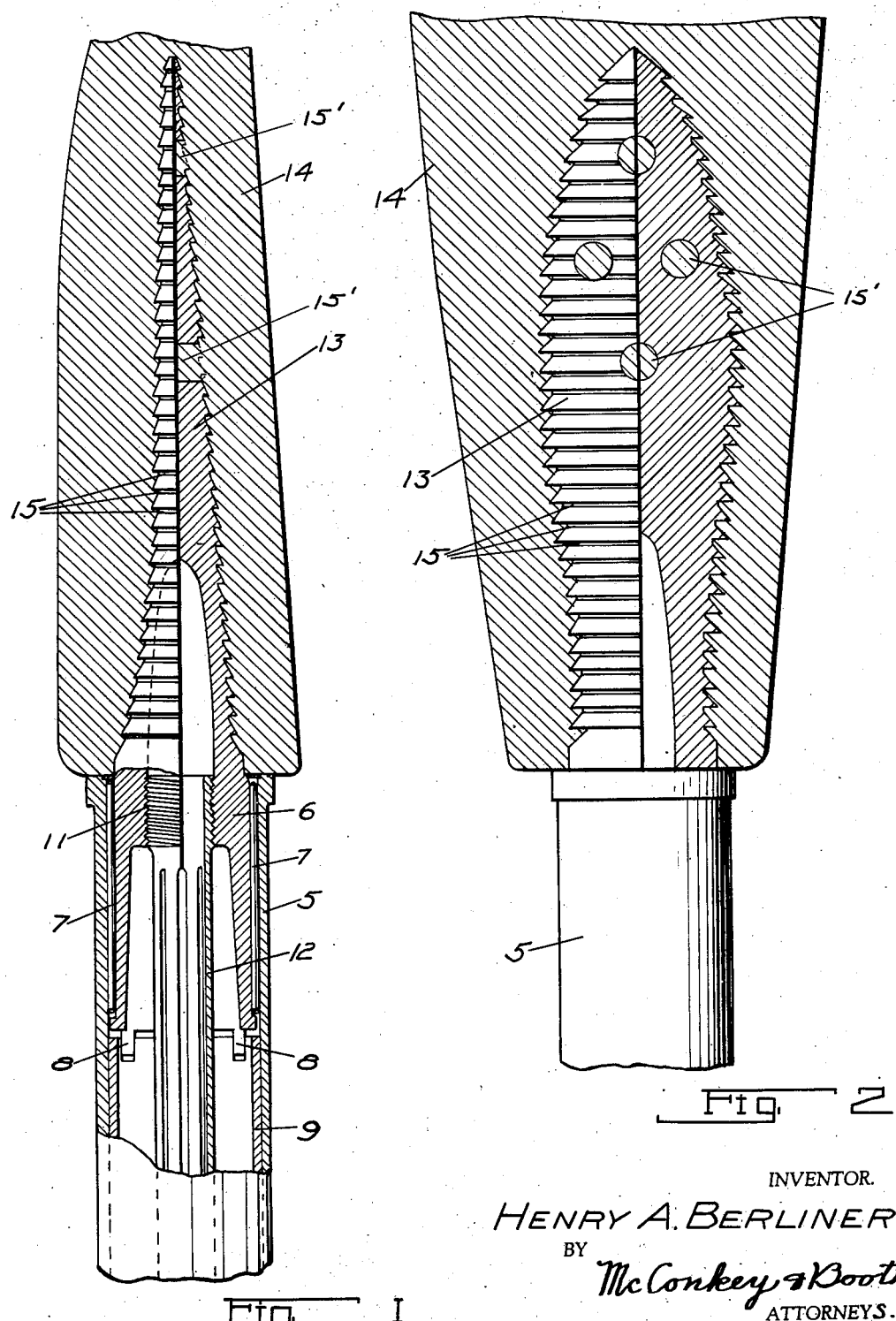

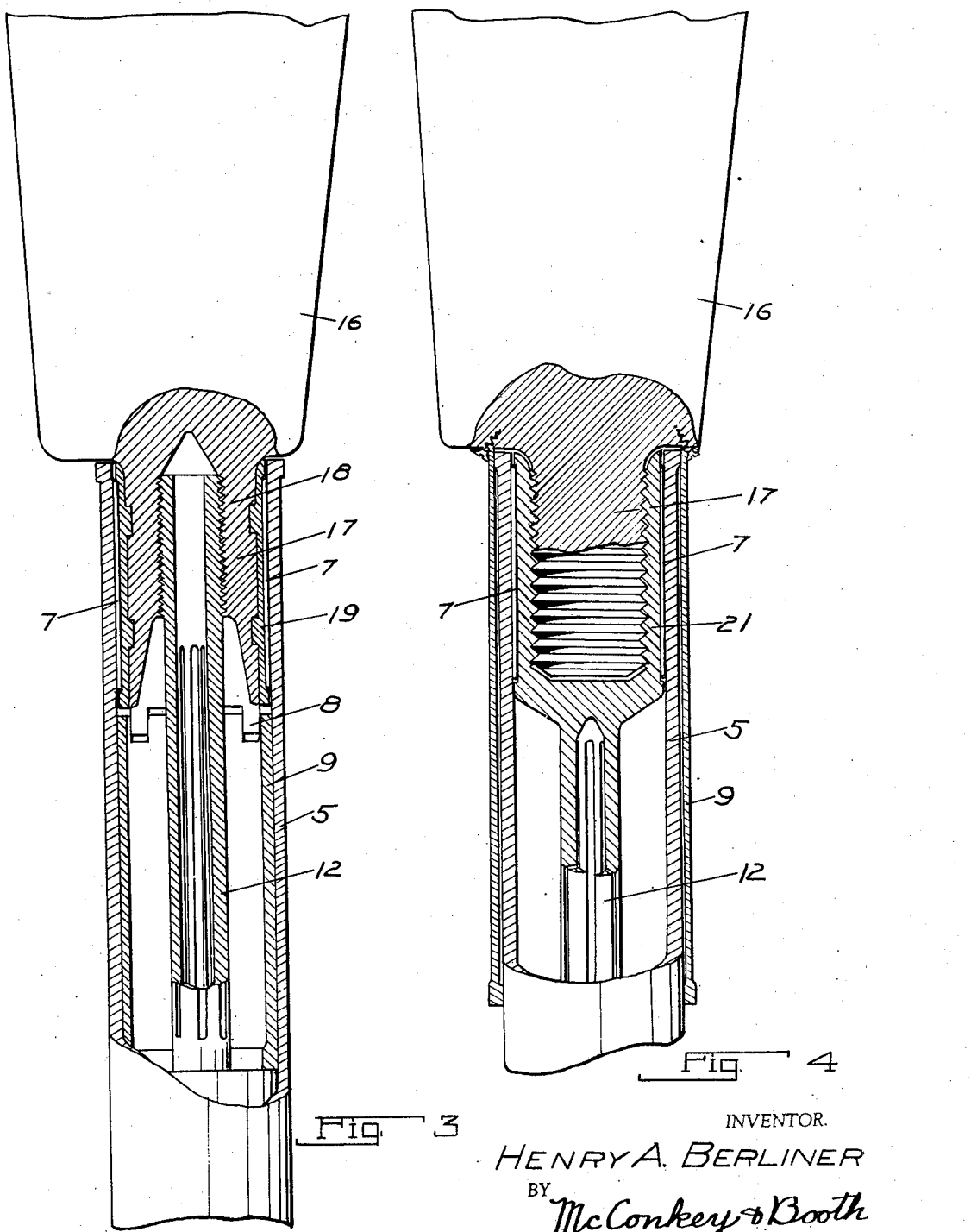

2,115,454

UNITED STATES PATENT OFFICE 2,115,454

PROPELLER

Henry A. Berliner, Washington, D. C.

Application March 7, 1936, Serial No. 67,588

3 Claims. (Cl. 170—173)

This invention relates to propellers and more particularly to blades for screw-type aircraft propellers.

In propellers for aircraft it is desirable to provide a blade having relatively light weight to reduce the centrifugal pull thereon during use and at the same time which has a hard, dense surface which will not be damaged easily. Steel blades answer the latter requirement but are relatively heavy and blades made of light material, such as wood, lack the requisite surface characteristics and are also too flexible.

I have found that a molded composition consisting of sheets of cloth impregnated with and bound together by phenolic condensation product or the like, commonly known as "micarta", has the requisite lightness, strength and surface characteristics. However, where a blade formed of such material is to be used in a propeller in which the blades are separately secured in the hub, as in a variable pitch propeller, they must be properly reinforced to carry the thrust load between the hub and blades.

It is accordingly one of the objects of the present invention to provide a propeller having blades formed of molded material properly reinforced.

Another object of the invention is to provide a propeller blade of molded material in which the root end of the blade is reinforced to carry the thrust load and which is formed for connection to a tension member to carry the centrifugal load.

Another object is to provide a propeller blade of molded material in which the root end of the blade is reinforced by a metal spud and an intimate bond is formed between the spud and the molded material.

Other objects, advantages and novel features of the invention will be apparent from the following description when read in connection with the accompanying drawings, in which:

Figure 1 is a partial central section with parts in elevation of a propeller embodying the invention;

Figure 2 is a partial section with parts in elevation at right angles to Figure 1; and Figures 3 and 4 are views similar to Figure 1 but on a smaller scale of modified constructions.

The propeller of Figures 1 and 2 is constituted by a hub socket 5 secured to the usual hub and adapted to be driven by an engine shaft. A metal spud 6 formed of steel or the like has a cylindrical portion adapted to be rotatably mounted in the socket 5 on suitable bearings indicated at 7. The inner or root end of the spud is formed with a series of teeth or the like 8 to interlock with complementary cavities in the end of a sleeve 9. If desired, the sleeve 9 may be connected to any desired type of pitch changing mechanism (not shown) for rotating the spud in the socket to change the pitch of the blade.

In order to secure the blade in the socket against the action of centrifugal force, the spud 6 is preferably provided with a tapped bore 11 to receive the threaded end of a tension member 12. As shown, the tension member 12 is of the type more particularly described and claimed in my copending application Serial No. 67,587, filed March 7, 1936, and comprises a tube formed with a series of slots intermediate its ends to provide an annular series of tension elements. As explained in said copending application, a member of this type is capable of being twisted, when the blade is turned to adjust its pitch, without appreciable shortening.

The spud 6 is formed with a reinforcing portion 13 tapered outwardly from the root portion thereof and a blade portion 14 of plastic or cementitious material such as reinforced phenolic condensation product is molded or cast around the reinforcing portion 13. As is apparent from Figures 1 and 2 the reinforcing portion 13 is substantially elliptical in cross-section so that no sharp corners are presented which might tend to concentrate the stress and so that better contact will be obtained between the molded material and the reinforcement. One type of molded material which is desirable for use in the present invention consists of phenolic condensation product reinforced by layers of textile cloth such as linen and which is sold under the trade name "micarta". In order to form an intimate bond between the reinforcing and molded portions, the portion 13 is formed with a series of parallel transverse grooves 15 which are filled with the blade material during molding of the portion 14 to provide an intimate bond between the spud and the molded material. If desired, the spud may also be formed with a plurality of holes 15' through which the blade material will extend to form a further mechanical interlock and to tie together the molded portions on opposite sides of the spud. Preferably the spud is relatively short as compared to the length of the blade, the portion 13 extending through approximately one-fourth to one-third and in any event less than one-half of the length of the molded portion 14.

The molded portion may be molded to shape or may, if desired, be molded to form a blank which is later formed to the desired shape by any suitable machining operation. In any event the molded material will be molded around the reinforcing portion under heat and pressure whereby it will be cured and will be caused to adhere to the reinforcing portion and to form a mechanical interlock with the grooves 15 and holes 15'.

Figure 3 illustrates a modified construction, parts therein corresponding to like parts in Figures 1 and 2 being designated by the same reference characters. The blade 16 of Figure 3 is of molded material throughout its length and has a cylindrical root portion 17 formed with a tapped bore 18 for reception of the threaded end of the tension member 12. The portion 17 is reinforced by a cylindrical sleeve 19 which may be molded thereon or fastened thereto after the molding is completed and which has a smooth outer surface for engagement with the bearing members 7. The sleeve 19 serves to reinforce the root end of the blade, distributing the thrust forces uniformly thereto, and provides a hard surface for engagement with the bearing.

The modification of Figure 4 is somewhat similar to that of Figure 3 and corresponding parts in these two figures have been indicated by the same reference numbers. In this modification, the root end of the blade 17 is formed with external screw threads to engage with internal screw threads in a cup-shaped member 21 formed integrally with or otherwise suitably secured to the tension member 12. The root end of the blade may be molded into the member 21, or if preferred, may be preformed and threaded into the member 21.

The member 21 serves as a reinforcement for the root end of the blade and also provides a smooth outer surface for engagement with the bearing 7. The sleeve 9 is shown mounted outside of and rotatable on the socket 5 and is secured directly to the blade at its outer end.

While several embodiments of the invention have been shown and described, it will be apparent that changes might be made therein, and it is not intended to be limited to the forms shown or otherwise than by the terms of the appended claims.

I claim:

1. A propeller blade comprising a spud having a cylindrical root portion adapted to be received in a hub socket and a reinforcing portion tapered outwardly of said root portion, said reinforcing portion being of substantially elliptical section and grooved substantially throughout its entire surface, and moldable material formed around said reinforcing portion with the material thereof entering said grooves to provide an intimate bond between said material and said spud.

2. A propeller blade comprising a spud having a cylindrical root portion adapted to be received in a hub socket and a reinforcing portion tapered outwardly of said root portion, said reinforcing portion being of substantially elliptical section and grooved substantially throughout its entire surface, and moldable material formed around said reinforcing portion to form a blade having a length at least twice that of the reinforcing portion, said material entering and filling said grooves to provide an intimate bond between the material and the spud.

3. A propeller blade comprising a blade portion of plastic material, a metallic reinforcement for the root end of the blade portion, the outer surface of said reinforcement being cylindrical and so arranged that it may be journaled in a hub socket, said reinforcement being adapted to take the propeller thrust load and distribute it gradually to the blade portion, and means in the root end of the blade for attachment to a tension member to take the centrifugal load of the blade.

HENRY A. BERLINER.